US009571618B2

(12) United States Patent
Brunn et al.

(10) Patent No.: US 9,571,618 B2
(45) Date of Patent: Feb. 14, 2017

(54) IDENTIFYING A CONTACT BASED ON A VOICE COMMUNICATION SESSION

(71) Applicant: International Business Machines Corporation, Armonk, NY (US)

(72) Inventors: Jonathan F. Brunn, Logan, UT (US); Jessica W. Forrester, Raleigh, NC (US); Stephen C. Hess, Durham, NC (US); Jeffrey R. Hoy, Southern Pines, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/982,666

(22) Filed: Dec. 29, 2015

(65) Prior Publication Data

US 2016/0111085 A1 Apr. 21, 2016

Related U.S. Application Data

(63) Continuation of application No. 13/935,115, filed on Jul. 3, 2013, now Pat. No. 9,294,617, which is a (Continued)

(51) Int. Cl.
*H04M 1/56* (2006.01)
*H04M 15/06* (2006.01)
(Continued)

(52) U.S. Cl.
CPC ........ *H04M 1/575* (2013.01); *G06F 17/30864* (2013.01); *G06F 17/30979* (2013.01); (Continued)

(58) Field of Classification Search
CPC ............ H04M 3/42042; H04L 65/1069; H04L 2201/41; G06F 17/30864; G10L 17/00
(Continued)

(56) References Cited

U.S. PATENT DOCUMENTS 5,651,053 A 7/1997 Mitchell
5,978,806 A 11/1999 Lund
(Continued)

FOREIGN PATENT DOCUMENTS

| CN | 2136559 Y | 6/1996 |
|---|---|---|
| CN | 102362471 A1 | 2/2012 |
| JP | 5227272 A1 | 9/1993 |

OTHER PUBLICATIONS

U.S. Appl. No. 13/931,949, Non-Final Office Action, Jun. 24, 2014, 11 pg.
(Continued)

*Primary Examiner* — Binh Tieu
(74) *Attorney, Agent, or Firm* — Cuenot, Forsythe & Kim, LLC

(57) ABSTRACT

Arrangements described herein include identifying a voice communication session established between a first communication device and a second communication device and, based on the voice communication session established between the first communication device and the second communication device, identifying a plurality of contacts who potentially may be the second user. A list including at least a name of each of the plurality of contacts who potentially may be the second user is presented to a first user using the first communication device.

11 Claims, 4 Drawing Sheets

Related U.S. Application Data continuation of application No. 13/931,949, filed on Jun. 30, 2013, now Pat. No. 9,294,616.

(51) Int. Cl.

| | | |
|---|---|---|
| *H04M 1/57* | (2006.01) | |
| *H04M 3/42* | (2006.01) | |
| *G06F 17/30* | (2006.01) | |
| *H04L 29/06* | (2006.01) | |
| *G10L 15/08* | (2006.01) | |
| *H04L 29/08* | (2006.01) | |
| *H04M 1/2745* | (2006.01) | |
| *G10L 17/00* | (2013.01) | |
| *G06Q 50/00* | (2012.01) | |

(52) U.S. Cl.
CPC ............ *G10L 15/08* (2013.01); *G10L 17/005* (2013.01); *H04L 65/1069* (2013.01); *H04L 67/12* (2013.01); *H04M 1/274508* (2013.01); *H04M 1/274533* (2013.01); *H04M 3/42042* (2013.01); *G06Q 50/01* (2013.01); *G10L 17/00* (2013.01); *H04M 2201/41* (2013.01)

(58) Field of Classification Search
USPC ............ 379/88.11, 88.19, 88.2, 88.21, 88.23, 379/142.01, 142.04, 142.06, 142.1, 379/142.09, 142.17, 93.17, 93.23
See application file for complete search history.

(56) References Cited

U.S. PATENT DOCUMENTS

| | | | |
|---|---|---|---|
| 5,999,611 A | 12/1999 | Tatchell | |
| 6,356,868 B1 | 3/2002 | Yuschik | |
| 6,529,871 B1 | 3/2003 | Kanevsky et al. | |
| 6,798,872 B1 | 9/2004 | Matsumoto et al. | |
| 6,799,872 B2 | 10/2004 | Kawai | |
| 6,978,238 B2 | 12/2005 | Wohlsen et al. | |
| 7,035,388 B2 | 4/2006 | Kurosaki | |
| 7,228,277 B2 | 6/2007 | Nagashima | |
| 7,231,019 B2 | 6/2007 | Pascovici | |
| 7,532,715 B2 * | 5/2009 | Miller .................... | H04M 1/663 379/142.07 |
| 7,657,005 B2 | 2/2010 | Chang | |
| 8,116,436 B2 | 2/2012 | Isenberg | |
| 8,175,650 B2 | 5/2012 | Colson et al. | |
| 8,185,132 B1 | 5/2012 | Katpelly et al. | |
| 8,295,820 B2 | 10/2012 | Gottfried | |
| 8,331,916 B2 | 12/2012 | Martin et al. | |
| 8,391,445 B2 | 3/2013 | Hoblit et al. | |
| 8,392,196 B2 | 3/2013 | De Los Reyes et al. | |
| 8,606,579 B2 | 12/2013 | Rasmussen | |
| 8,774,773 B1 * | 7/2014 | Sigmund ........... | H04M 3/42365 379/201.1 |
| 9,294,616 B2 | 3/2016 | Brunn et al. | |
| 9,294,617 B2 | 3/2016 | Brunn et al. | |
| 2005/0175159 A1 * | 8/2005 | Cooper ............... | G10L 15/1815 379/88.03 |
| 2005/0233730 A1 | 10/2005 | Snyder | |
| 2008/0261568 A1 * | 10/2008 | Lopez ............. | H04M 1/274516 455/414.1 |
| 2010/0246784 A1 * | 9/2010 | Frazier ................ | H04L 65/1083 379/88.13 |
| 2011/0093266 A1 | 4/2011 | Tham | |
| 2012/0149347 A1 | 6/2012 | Scott et al. | |
| 2012/0157751 A1 | 6/2012 | Consigny et al. | |
| 2012/0158751 A1 | 6/2012 | Tseng | |
| 2012/0174203 A1 | 7/2012 | Frank | |
| 2013/0006634 A1 * | 1/2013 | Grokop .................. | G10L 17/10 704/245 |
| 2013/0144950 A1 * | 6/2013 | Sanakaranarasimhan .............................. | G06Q 10/10 709/204 |
| 2014/0065997 A1 * | 3/2014 | Walker .................... | H04W 4/02 455/404.1 |
| 2014/0119523 A1 * | 5/2014 | Ray ....................... | H04M 1/247 379/142.1 |
| 2015/0003599 A1 | 1/2015 | Brunn et al. | |
| 2015/0006568 A1 | 1/2015 | Brunn et al. | |
| 2015/0120288 A1 * | 4/2015 | Thomson ................ | G10L 15/22 704/231 |
| 2016/0134736 A1 | 5/2016 | Brunn et al. | |

OTHER PUBLICATIONS

U.S. Appl. No. 13/931,949, Final Office Action, Nov. 25, 2014, 17 pg.
U.S. Appl. No. 13/931,949, Non-Final Office Action, Jul. 30, 2015, 9 pg.
U.S. Appl. No. 13/931,949, Notice of Allowance, Dec. 4, 2015, 10 pg.
U.S. Appl. No. 13/935,115, Non-Final Office Action, Sep. 9, 2014, 10 pg.
U.S. Appl. No. 13/935,115, Final Office Action, Jan. 5, 2015, 17 pg.
U.S. Appl. No. 13/935,115, Non-Final Office Action, Jul. 30, 2015, 9 pg.
U.S. Appl. No. 13/935,115 Notice of Allowance, Dec. 4, 2015, 10 pg.
U.S. Appl. No. 14/982,528, Non-Final Office Action, Apr. 6, 2016, 5 pg.

\* cited by examiner

300

---

Identify a voice communication session established between a first communication device and a second communication device
302

↓

Perform, via a processor, voice processing on voice signals generated by at least a second user using the second communication device to identify at least one word spoken by the second user
304

↓

Based at least on the word spoken by the second user, identify a plurality of contacts who potentially may be the second user and generate a confidence score for each of the respective contacts
306

↓

Present to a first user using the first communication device a list including at least a name of each of the plurality of contacts who potentially may be the second user
308

↓

Receive from the first user a selection of at least one name from the list
310

↓

Responsive to receiving the selection of the at least one name, prompt the first user to indicate whether the first user desires to have the contact corresponding to the selected name added to a contact list of the first user and/or whether the first user desires to contact with, or follow, the contact corresponding to the selected name in a social network
312

↓

Responsive to receiving from the first user a user input indicating that the first user desires to have the contact corresponding to the selected name added to the contact list of the first user and/or that the first user desires to contact with, or follow, the contact corresponding to the selected name in the social network, add the contact corresponding to the selected name to the contact list of the first user and/or add the contact corresponding to the selected name to a contact list of the first user in the social network
314

FIG. 3

IDENTIFYING A CONTACT BASED ON A VOICE COMMUNICATION SESSION

BACKGROUND

Arrangements described herein relate to voice communications and, more particularly, to identifying a contact based on a voice communication session.

Caller identification (caller ID), is a telephone service that transmits a caller's telephone number to the called party's telephone equipment during the ringing signal, or when the call is being set up but before the call is answered. Where available, a caller ID sometimes also provides a name associated with the calling telephone number, though this name is not necessarily the name of the person actually placing the call. Instead, it is the name of the person to whom the calling telephone number is assigned. Thus, if a caller uses another person's phone to place a call, the name presented by the caller ID will not indicate the actual caller. Also, sometimes caller IDs are blocked.

BRIEF SUMMARY

One or more embodiments disclosed within this specification relate to voice communications and, more particularly, to identifying a contact based on a voice communication session.

A system includes a processor programmed to initiate executable operations. The executable operations can include identifying a voice communication session established between a first communication device and a second communication device and, based on the voice communication session established between the first communication device and the second communication device, identifying a plurality of contacts who potentially may be the second user. A list including at least a name of each of the plurality of contacts who potentially may be the second user is presented to a first user using the first communication device.

A computer program product includes a computer-readable storage medium having program code stored thereon. The program code is executable by a processor to perform a method. The method can include identifying, using the processor, a voice communication session established between a first communication device and a second communication device and, based on the voice communication session established between the first communication device and the second communication device, using the processor, identifying a plurality of contacts who potentially may be the second user. A list including at least a name of each of the plurality of contacts who potentially may be the second user is presented, using the processor, to a first user using the first communication device.

BRIEF DESCRIPTION OF THE SEVERAL VIEWS OF THE DRAWINGS

FIG. 3 is a flow chart illustrating a method of identifying a contact based on an incoming call in accordance with another embodiment disclosed within this specification.

DETAILED DESCRIPTION

Figure 1:
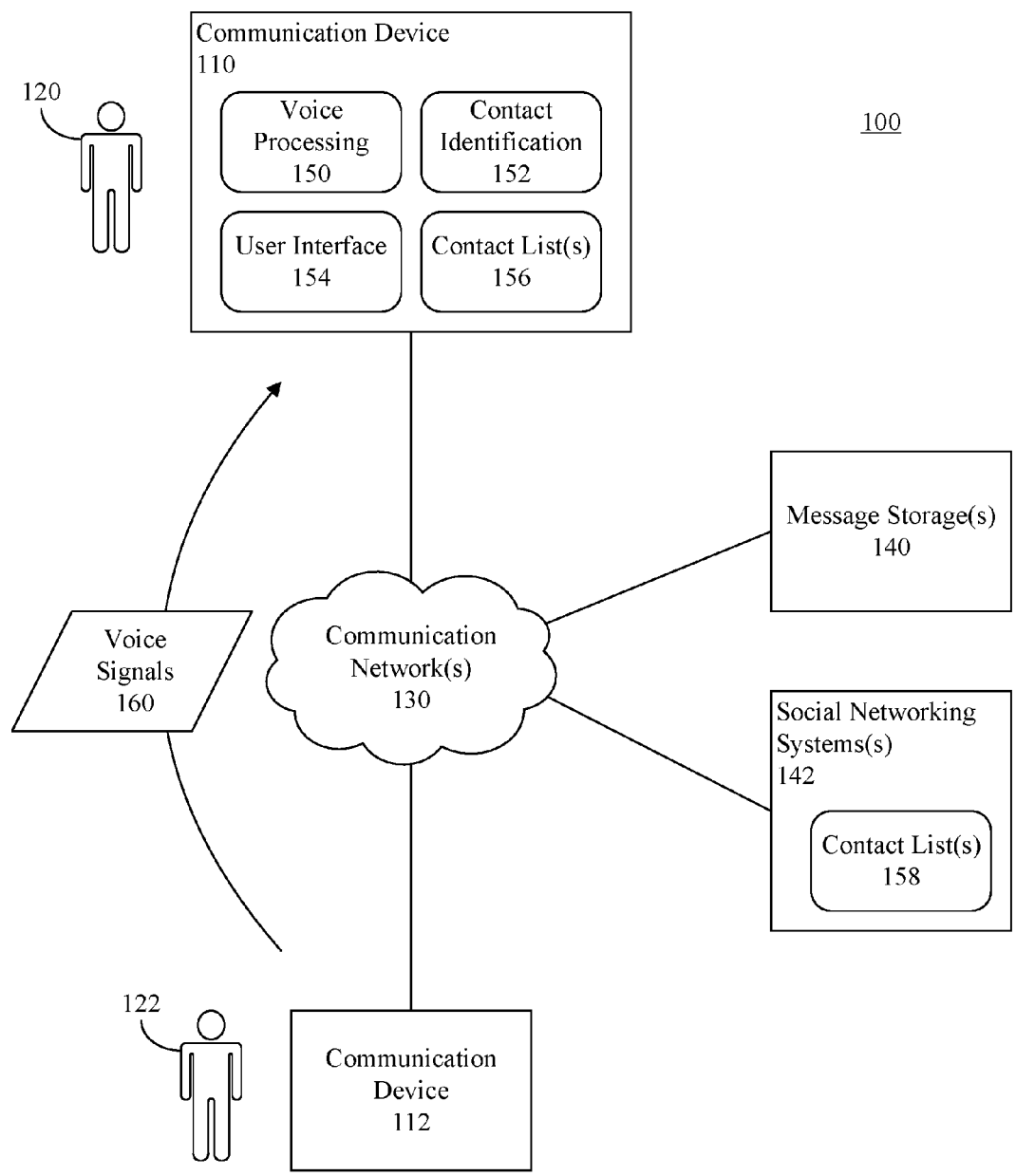
FIG. 1 is a block diagram illustrating a system for identifying a contact based on an incoming call in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As defined herein, the term "computer-readable storage medium" means a tangible storage medium that contains or stores program code for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to facilitating, for a first user, identification of a second user in a voice communication session. Based on the communication session, a list including the names of the contacts who potentially may be the second user can be presented to a first user. Moreover, the list also can include a confidence score for each contact in the list. Each confidence score can indicate a level of confidence for each respective contact that the contact is the second user. The first user can select a name of a contact from the list, and that contact can be automatically added to the first user's contact list. Further, the first user can be provided one or more options connect with, or follow, a selected contact in a social network.

FIG. 1 is a block diagram illustrating a system 100 for identifying a contact based on an incoming call in accordance with one embodiment disclosed within this specification. The system 100 can include a first communication device 110 and a second communication device 112. The communication devices 110, 112 can be telephones, mobile phones, smart phones, computers (e.g., workstations, desktop computers, laptop computers, mobile computers, tablet computers, or the like), personal digital assistants, or any other communication device via which users 120, 122 can communicate using voice communications. The communication devices 110, 112 also may communicate via audio/video communications.

The communication devices 110, 112 can be communicatively linked via one or more communication networks 130. The communication networks 130 can be implemented as, or include, any of a variety of different networks such as a WAN, a LAN, a wireless network, a mobile network, a Virtual Private Network (VPN), the Internet, the Public Switched Telephone Network (PSTN), or the like.

The communication device 110 and, optionally, the communication device 112 can be communicatively linked to one or more message storages 140. The message storage(s) 140 can store e-mails, text messages, voice messages, or messages generated using any other form of communication. As described herein, an e-mail is a form of a message. In one arrangement, the message storage(s) 140 can be provided by servers, network-attached storages (NASs), or any other suitable devices or systems configured to store message, and the communication devices 110, 112 can be communicatively linked to the message storage(s) 140 via the communication network(s) 130. For example, the message storage(s) 140 can be e-mail servers that store e-mails to suitable computer-readable storage mediums, messaging servers that store text messages, voice messaging servers that store voice messages, or the like. In another arrangement, the communication device 110 and, optionally, the communication device 112 each can comprise one or more message storage(s) 140 that store messages locally on the communication devices 110, 112 or to locally connected NASs. For example, the message storage(s) 140 can be e-mail clients, text messaging clients, voice messaging clients, or any other communication clients that store e-mails, text messages, voice messages, etc. to a local computer-readable storage medium.

The communication device 110 and, optionally, the communication device 112 also can be communicatively linked to one or more social networking systems 142 via the communication network(s) 130. As used herein, the term "social networking system" means a system that provides social networking services, for instance via one or more websites. A social networking service is an online service platform on which social networks or social relations are built among people who, for example, share interests, activities, backgrounds or real-life connections. A social network service typically comprises a representation of each user, often a user profile, his/her social links with other people (i.e., contacts), and a variety of additional services. The social networking system(s) 142 can include one or more computer-readable storage mediums where user profiles, contacts, and other information is stored. In one arrangement, the social networking systems 142 can be accessed via delegated access protocols, for example in accordance with the open standard for authorization (OAuth), though the present arrangements are no limited in this regard.

The communication network(s) 130 via which the communication devices 110, 112 communicate need not be the same communication network(s) 130 via which the communication devices 110, 112 communicate with the message storage(s) 140 and the social networking system(s) 142. For example, the communication devices 110, 112 can communicate with one another via a PSTN and communicate with the message storage(s) 140 and social networking system(s) 142 via the Internet.

The communication device 110 can include a user interface 154 and, optionally, a voice processing module 150, a contact identification module 152 and one or more contact lists 156. In one arrangement, a contact list 156 can be stored in an e-mail client, a text messaging client, a voice messaging client, contact management software, or the like executed on the communication device 110. In another arrangement, one or more contact lists 156 can be stored by a server that provides e-mail, text messaging, voice messaging and/or contact related services to the communication device 110, for example a server that provides the message storage(s) 140. Further, one or more contact lists 158 can be stored by the social networking system(s) 142. Although the voice processing module 150 and contact identification module 152 may be components of the communication device 110, this need not be the case. For example, the voice processing module 150 and/or the contact identification module 152 may be components of another device or system comprising a processor to which the communication device 110 is communicatively linked, for example a server.

The voice processing module 150 can perform speech recognition on voice signals 160 received from the communication device 112 via the communication network(s) 130 either during a communication session or after the communication session is complete. More particularly, the voice processing module 150 can detect spoken utterances of the user 122 of the communication device 112 in the voice signals 160 and, based on the spoken utterances, identify words, terms and/or phrases spoken by the user 120 and/or the 122. In illustration, the voice processing module 150 can translate spoken words, terms and/or phrases to text, and identify the words, terms and/or phrases in the translated text.

The voice processing module 150 also can perform voice recognition, also known as speaker recognition, to identify a voice print of the user 122 of the communication device 112. As used herein, a voiceprint is a set of measurable characteristics of a human voice that uniquely identifies an individual. These characteristics, which are based on the physical configuration of a speaker's mouth and throat, can be expressed as a mathematical formula. In one arrangement, the voice processing module 150 can process a vocal sample contained in the voice signals 160, and compare that vocal sample to one or more derived mathematical formulas, and/or a graphical representations of the mathematical formulas, previously generated for various contacts contained in the contact list(s) 156, 158. In another arrangement, the voice processing module 150 can process a vocal sample contained in the voice signals 160 to generate one or more derived mathematical formulas, and/or a graphical representations of the mathematical formulas, and compare previously stored voice samples of various contacts to these mathematical formulas and/or graphical representations. Such voice samples can be associated with contacts contained in the contact list(s) 156, 158.

Based on the speech recognition and/or voice recognition performed by the voice processing module 150, the contact identification module 152 can identify one or more contacts in the contact list(s) 156 and/or the contact list(s) 158 that may be the user 122 of the communication device 112 who is currently speaking with the user 120 of the communication device 110 in a voice communication session or an audio/video communication session. Such identification of the contacts can be implemented in accordance with any of the various arrangements described herein.

The voice processing module 150 can process the voice signals 160 in real time as the voice signals 160 are received by the communication device 110, or process a recording of such voice signals 160. For example, the voice signals 160 can be recorded and processed by the voice processing module 150 when desired to identify contacts who may be the user 122. As used herein, the term "real time" means a level of processing responsiveness that a user or system senses as sufficiently immediate for a particular process or determination to be made, or that enables the processor to keep up with some external process.

In one arrangement, the voice processing module 150 can identify the context of the utterances spoken by the user 120 and/or the user 122, and use this context to identify potential contacts who may be the user 122. In illustration, the contact identification module 152 can process information generated by the voice processing module 150 using speech recognition to identify a name, or a portion of a name, contained in the voice signals 160 and the context of the voice signals 160 to identify one or more contacts. For example, if the voice signals 160 include a spoken utterance of the name "John" and a spoken utterance of "job application," the contact identification module 152 can analyze previously received messages (e.g., e-mails, text messages, voice, messages, etc.) stored on the communication device 110 and/or e-messages stored on the message storage(s) 140 to identify messages sent to or received from a person named "John," "Jon," "Juan," etc. and/or e-mails that in the body of the e-mails refer to named "John," "Jon," "Juan," etc. The contact identification module 152 also can identify any of such messages that include the term "job application," for example in a body or subject field of the messages. Based on these messages, the contact identification module 152 can identify as contacts who potentially may be the user 122 senders or recipients of such messages and/or people identified in such messages. With regard to people identified in the messages, the contact identification module 152 can identify people having a name corresponding to a name identified in the messages, and different spellings of names can be considered during this process.

Similarly, if the voice signals 160 include a spoken utterance of the name "John" and a spoken utterance of "job application," the contact identification module 152 can analyze posts in one or more social networks hosted by the social networking systems 142 created by, or responding to, a person named "John," "Jon," "Juan," etc. and/or posts that in the body of the posts refer to named "John," "Jon," "Juan," etc. The contact identification module 152 also can identify any of such posts that include the text "job application," for example in a body or subject field of the posts. Based on these posts, the contact identification module 152 can identify as contacts that potentially may be the user 122 persons providing or receiving such posts and/or people identified in such posts. The contact identification module 152 can generate at least one parameter used to determine confidence scores that indicate a level of confidence that such contacts are the user 122. With regard to people identified in the posts, the contact identification module 152 can identify people having a name corresponding to a name identified in the posts, and different spellings of names can be considered during this process.

Moreover, the present arrangements are not limited to identifying users listed in the contact lists 156, 158. For example, if the user 122 utters the word "John," the contact identification module 152 can search for contacts named "John" not only in contact lists of the user, but also in contact lists of contacts listed in the contact list(s) 156, 158 of the user. For example, if the user 120 has a contact named "Jane," Jane's contact lists can be searched to identify the potential contacts if Jane's contact list(s) are available to the contact identification module 152. In illustration, if the user 122 utters "this is John, a friend of Jane," the contact identification module 152 can identify this phrase and, based on this phrase, search in Jane's contact list(s) contacts who have a name including the word "John," especially contacts Jane has identified as being friends since the user 122 has indicated that he/she is a friend of "Jane." In addition, the telephone number provided by a conventional caller ID function can be processed, in addition to spoken utterances, to identify contacts.

The time messages are sent and/or posts in the social network(s) are created also can be considered when determining the contacts who potentially may be the user 122. For example, if the messages and/or posts are generated during working hours, the contact identification module 152 can focus on contacts that are related to the user 120 via business relationships. For example the contact identification module 152 can focus on contacts that sent, received or are identified in the messages and/or posts generated during normal business hours corresponding persons generating the messages and/or posts. In this regard, the voice signals 160 can be partially filtered based on the time the voice communication takes place and/or the content identified in the voice signals 160 and/or voice signals generated by the user 120. Such filtering may be implemented for example, to provide privacy or security. Nonetheless, the time messages are sent and/or posts in the social network(s) are created can be processed to create at least one parameter used to determine confidence scores that such contacts are the user 122. For example, more recent messages and/or posts can be given greater weight than older messages and/or posts when identifying potential contacts and when generating at least one parameter used to determine confidence scores to the potential contacts.

Further, information, such as a user profile, location and other background information related to contacts identified in the contact lists 156, 158 can be considered when determining the contacts who potentially may be the second user 122. For example, the contact identification module 152 can identify user profiles (including personal information), mutual acquaintances, employer company names, telephone numbers, or other information of contacts contained in the contact list(s) 156, 158 to identify contacts having similar user profiles and/or information, and process such information to generate at least one parameter used to determine confidence scores that such contacts are the user 122.

Similarly, location information, such as telephone numbers, area codes, GPS coordinates, addresses, etc. identified in the voice signals 160, or other information received by the communication device 110 regarding the communication device (e.g., a caller ID), can be processed by the contact identification module 152 to identify contacts contained in the contact list(s) 156, 158 having a location similar to the user 120 and/or a location similar to location information contained in one or more messages contained in the message storage(s) 140. The results of such processing also can be used to generate at least one parameter used to determine confidence scores that such contacts are the user 122.

In one aspect, the contact identification module 152 can identify contacts whose voice prints (i.e., voice print data) may match the voice print of the user 122, and eliminate from consideration as potential contacts those contacts having voice prints that do not at least partially match the voice print of the user 122. For the contacts whose voice prints may at least partially match the voice print of the user 122, the similarity between such voice prints to the voice print of the user 122 determined by processing the voice signals 160 can be identified to generate at least one parameter used to generate the confidence score for the respective contacts. The confidence scores may be percentile scores, but the present arrangements are not limited in this regard. Further, the contact identification module 152 can process voice prints to specifically exclude candidate matches. For example, when a plurality of potential contacts are identified based on other information, and there is a high level of certainty that the voice print of the user 122 does not match the voice print(s) of one or more of the potential contacts, those potential contacts need not be presented in the list of contacts who potentially may be the second user 122.

In one arrangement, the contact identification module 152 can consider the distance between the user 120 and potential contacts identified in the social networking system(s) 142 to generate at least one parameter used to generate the confidence score for the respective contacts. For example, if a particular contact is contained in the contact list 158, a particular parameter can be generated for that contact. That parameter can be based, at least in part, on the level of association between the contact contained in the contact list 158 and the user 120, for example how frequently that contact and the user 120 communicate, whether the work for the same company, whether they have common interests, etc. Further, if the communication takes place during work hours and/or utters a word, term or phrase that indicates the place of employment of the first user 120, contacts contained in contact list(s) 158 associated with professional social networks can be assigned parameters with greater weight than parameters assigned to contacts contained in contact list(s) of other social networks. For instance, if the user 120 is an employee of IBM, parameters assigned to potential contacts identified in "IBM SmartCloud™" can be assigned greater weight than parameters assigned to potential contacts in other social networks.

If a particular contact is not contained in the contact list 158, but is a direct contact of a contact contained in the contact list 158, a different parameter can be generated for that particular contact. That parameter can be based, at least in part, on the level of association between the contact contained in the contact list 158 and the user 120. If a particular contact is not contained in the contact list 158, but is an indirect contact of a contact contained in the contact list 158, another different parameter can be generated for that particular contact. In this regard, at least one parameter assigned to any particular potential contact can be based on the distance between the particular contact and the user 120 in the social network and/or any acquaintances, if any, between the particular contact and the user 120 in the social network The user interface 154 can present one or more user selectable items, for example items in a preferences menu, for the user 120 to enable or disable identification of other users (e.g., the user 122), specify particular message accounts and/or particular social networks to be used for user identification, and the like.

Moreover, the contact identification module 152 can generate a confidence score, based on one or more of the parameters described herein, for each of the respective contacts. The confidence score for each respective contact can indicate a level of confidence that the respective contact is the user 122. The user interface 154 can present the potential contacts and the respective contacts to the user 120, for example via a suitable display.

In some instances, the communication device 110 and/or the communication device 110 may be configured to indicate that the voice signals 160 and/or voice signals generated by the communication device 120 may not be recorded or electronically analyzed, for example via one or more user settings. In such instances, the location information, background information, etc., obtained in accordance with any of the arrangements described herein, exclusive of processing the voice signals, can be processed to identify contacts who potentially may be the user 122 without recording or electronically analyzing the voice signals.

Figure 2:
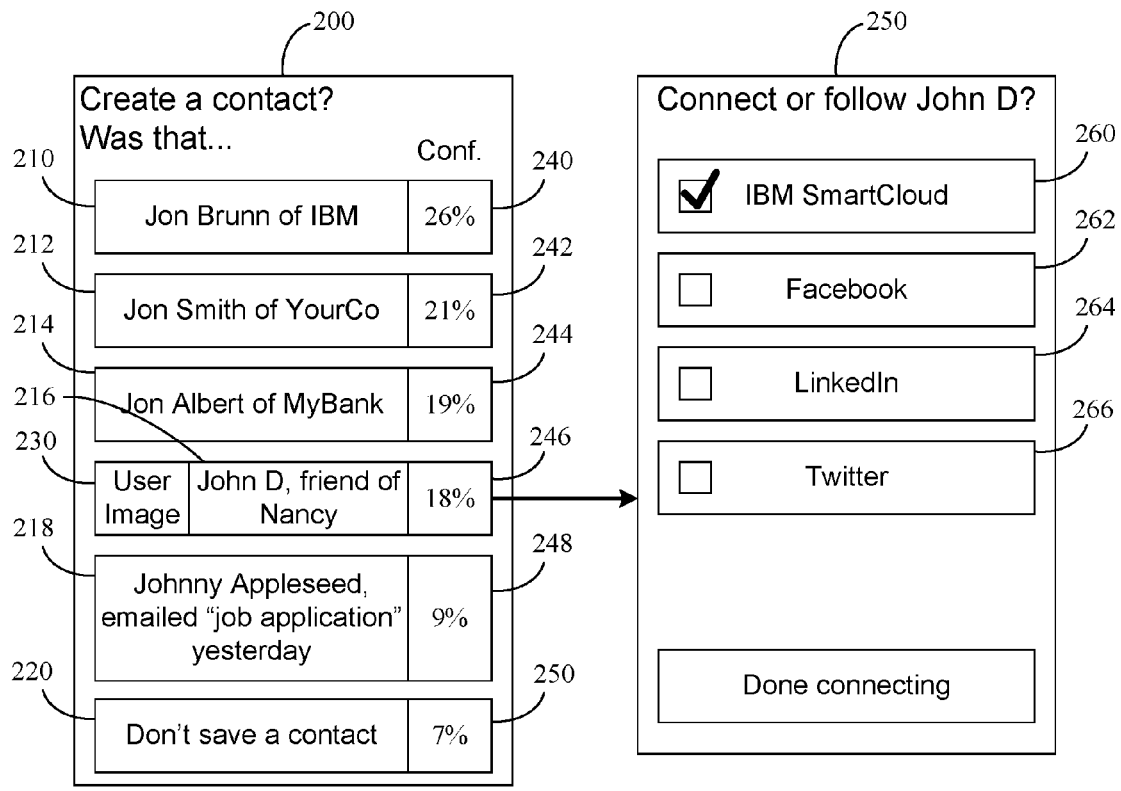
FIG. 2 depicts views presented by a user interface of a communication device in accordance with one embodiment disclosed within this specification.

FIG. 2 depicts views 200, 250 presented by the user interface 154 on the communication device 110 in accordance with one embodiment disclosed within this specification. The views 200, 250 may be presented on a display of the communication device 110. If one or more of the views 200, 250 are too large to fit on the display in their entirety, the user 120 can be provided an option to scroll through the views 200, 250, as is known to those skilled in the art. Further, if the communication device 110 is a smart phone, the display can be turned off when the user interface 154 detects that the display is positioned immediately proximate to the user (e.g., while talking), also as known to those skilled in the art.

Responsive to the contact identification module 152 identifying one or more contacts who potentially may be the user 122, the user interface 254 can present the view 200. The view 200 can present a list of names 210, 212, 214, 216, 218, 220 for each of the contacts identified as potentially being the user 122. Further, when one or more images are available for the respective contacts, the user interface 254 can present such images with the names. For example, for the contact "John D," the user interface can present an image 230. The user interface 254 also can present the confidence score 240, 242, 244, 246, 248, 250 determined for each potential contact, for example proximate to the respective names 210-220, based on the confidence parameters described herein. In one arrangement, the names of the contacts presented in the list can be the names of contacts having an associated confidence score above a particular threshold value.

Notably, processing of the contact information described herein can be performed in real time when a voice communication session, e.g., a phone call, is established. Accordingly, the view 200 can be presented to the user 120 at the beginning of the voice communication session, or at any time during the voice communication session or after the voice communication session is complete. Even if the view 200 is presented at the beginning of the voice communication session, as the voice processing module 150 continually gathers additional data from the voice signals 160, the list of names 210-220 presented in the view 200 and the confidence scores 240-250 can be dynamically updated based on the additional data. In another arrangement, the voice processing module 150 may be configured only to process voice signals 160 from a certain portion of the voice communication session, for example during a first portion of the voice communication session.

From the view 200, the user 120 can select at least one name presented in the view 200 corresponding to a contact who potentially may be the user 122. In response, the contact identification module 152 can prompt the user to indicate whether the user 120 desires to add the selected contact to one or more of the contact lists 156, 158. If the user chooses to do so, the contact identification module 152 can add the selected contact to one or more of the contact lists 156, 158. In one arrangement, the user 120 can specify which contact lists 156, 158 in which the selected contact is to be added.

Further, in response to the user selecting at least one name presented in the view 200 corresponding to a contact who potentially may be the user 122, the user interface 154 can present the view 250 indicating social networks 260, 262, 264, 266 in which the selected contact participates. The user 120 can be prompted to indicate whether the user 120 desires to add the selected contact in one or more of the social networks 260, 262, 264, 266 as a contact of the user 120 or as a contact the user 120 chooses to follow in the social network(s) 260-266.

In one aspect, the user interface 154 can receive from the user 120 voice commands entering the various user inputs described herein. In illustration, the voice processing module 150 can process spoken utterances provided by the user 120, and cooperate with the user interface 154 for the user interface to interpret such spoken utterances as user inputs. The user interface 154 also can be configured to detect gestures and other user inputs, and processing such user inputs as described herein.

Referring again to FIG. 1, the present arrangements also can be applied to conference calls to distinguish multiple callers on the call. In illustration, the voice processing module 150 can identify voice prints of respective users participating in the conference call. The voice prints can be processed, for example as previously described, to differentiate users. Spoken utterances can be processed by the voice processing module 150 to associate each speaker in the conference call with a list of potential contacts. Accordingly, the present arrangements can provide a list indicating contacts who potentially may be users participating in the conference call based on the voice signals generated during the conference call. At least a portion of such voice signals may include the voice signals 160.

FIG. 3 is a flow chart illustrating a method 300 of identifying a contact based on an incoming call in accordance with another embodiment disclosed within this specification. At step 302, a voice communication session established between a first communication device and a second communication device can be identified. At step 304, via a processor, voice processing can be performed on voice signals generated by at least a second user using the second communication device to identify at least one utterance spoken by the second user.

At step 306, based at least on the utterance spoken by the second user, a plurality of contacts who potentially may be the second user can be identified. In one arrangement, a voice print of the second user can be detected based on the at least one utterance spoken by the user. Identifying the plurality of contacts who potentially may be the second user can include comparing the detected voice print to voice print data associated with at least one of the plurality of contacts.

In another arrangement, the at least one spoken utterance can be identified as being a name. A social networking system can be queried for information of users of the social networking system who match the name. Identifying the plurality of contacts who potentially may be the second user can include receiving from the social networking system the information of the users of the social networking system who match the name and analyzing such information.

In another arrangement, previously received messages can be analyzed to identify at least one message that includes at least one written word correlating to the at least one utterance spoken by the second user. For example, content contained in respective bodies or subject lines of the previously received messages can be analyzed. A sender or receiver of the at least one message can be identified as a contact who potentially may be the second user.

Further, a confidence score can be generated for each of the respective contacts. The confidence score can be generated, for example, based at least on contact information of the respective contacts identified as potentially being the second user, subject lines and/or contact of messages, results of one or more voice print comparisons, etc. The confidence score for each respective contact can indicate a level of confidence that the respective contact is the second user.

At step 308, a list including at least a name of each of the plurality of contacts who potentially may be the second user can be presented to the first user. The contacts can be ranked in the list according to the confidence score. In one non-limiting arrangement, the plurality of contacts presented in the list can be those contacts having an associated confidence score above a particular threshold value.

At step 310, a selection of at least one name from the list can be received from the first user. At step 312, responsive to receiving the selection of the at least one name, the first user can be prompted to indicate whether the first user desires to have the contact corresponding to the selected name added to a contact list of the first user and/or whether the first user desires to contact with, or follow, the contact corresponding to the selected name in a social network. At step 314, responsive to receiving from the first user a user input indicating that the first user desires to have the contact corresponding to the selected name added to the contact list of the first user and/or that the first user desires to contact with, or follow, the contact corresponding to the selected name in the social network, the contact corresponding to the selected name can be added to the contact list of the first user, for example a contact list maintained in an message client, message server, contact management system, etc., and/or the contact corresponding to the selected name can be added to a contact list of the first user in the social network.

Figure 4:
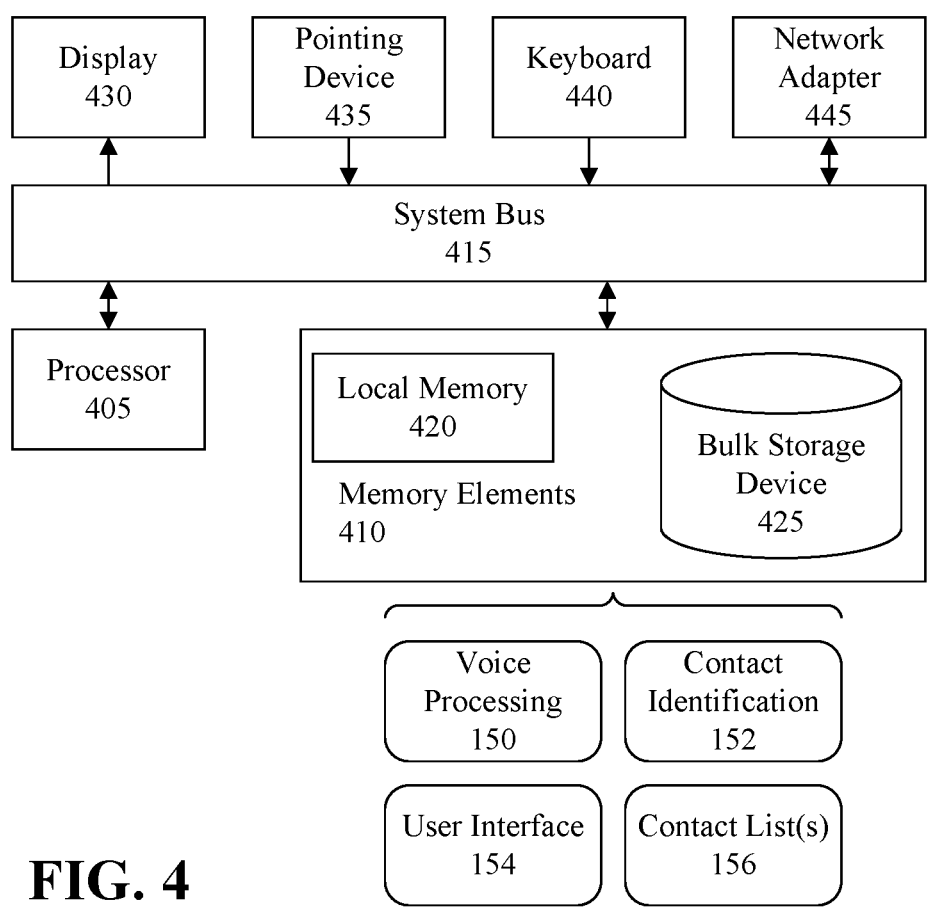
FIG. 4 is a block diagram of a communication device in accordance with one embodiment disclosed within this specification.

FIG. 4 is a block diagram of the communication device 110 of FIG. 1 in accordance with one embodiment disclosed within this specification. The communication device 110 can include at least one processor 405 (e.g., a central processing unit) coupled to memory elements 410 through a system bus 415 or other suitable circuitry. As such, the communication device 110 can store program code within the memory elements 410. The processor 405 can execute the program code accessed from the memory elements 410 via the system bus 415. It should be appreciated that the communication device 110 can be implemented in the form of any system including a processor and memory that is capable of performing the functions and/or operations described within this specification. For example, the communication device 110 can be implemented as a computer, a workstation, a mobile computer, a laptop computer, tablet computer, a smart phone, a personal digital assistant, a gaming device, an appliance, and so on.

The memory elements 410 can include one or more physical memory devices such as, for example, local memory 420 and one or more bulk storage devices 425. Local memory 420 refers to RAM or other non-persistent memory device(s) generally used during actual execution of the program code. The bulk storage device(s) 425 can be implemented as a hard disk drive (HDD), solid state drive (SSD), or other persistent data storage device. The communication device 110 also can include one or more cache memories (not shown) that provide temporary storage of at least some program code in order to reduce the number of times program code must be retrieved from the bulk storage device 425 during execution.

Input/output (I/O) devices such as a display 430, a pointing device 435 and, optionally, a keyboard 440 can be coupled to the communication device 110. The I/O devices can be coupled to the communication device 110 either directly or through intervening I/O controllers. For example, the display 430 can be coupled to the communication device 110 via a graphics processing unit (GPU), which may be a component of the processor 405 or a discrete device. One or more network adapters 445 also can be coupled to communication device 110 to enable communication device 110 to become coupled to other systems, computer systems, communication devices, remote printers, and/or remote storage devices through intervening private or public networks. Modems, cable modems, transceivers, and Ethernet cards are examples of different types of network adapters 445 that can be used with communication device 110.

As pictured in FIG. 4, the memory elements 410 can store the components of the communication device 110, namely the user interface 154 and, optionally, the voice processing module 150, the contact identification module 152 and one or more contact lists 156. Being implemented in the form of executable program code, the user interface 154 and, optionally, the voice processing module 150 and the contact identification module 152 can be executed by the communication device 110 and, as such, can be considered part of the communication device 110. Moreover, the user interface 154, the voice processing module 150, the contact identification module 152 and contact list(s) 156 are functional data structures that impart functionality when employed as part of the communication device 110 of FIGS. 1 and 4.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method, comprising:
   identifying a voice communication session established between a first communication device and a second communication device;
   based on the voice communication session established between the first communication device and the second communication device, identifying location information associated with the second communication device and identifying, using a processor, a plurality of contacts who potentially is a second user using the second communication device by identifying contacts associated with the location information; and
   presenting to a first user using the first communication device a list including at least a name of each of the plurality of contacts who potentially is the second user using the second communication device.

2. The method of claim 1, further comprising:
   performing voice processing on voice signals generated by the second user using the second communication device to identify at least one utterance spoken by the second user;
   wherein identifying the plurality of contacts who potentially is the second user using the second communication device further comprises analyzing the at least one utterance spoken by the second user.

3. The method of claim 2, further comprising:
   analyzing at least the utterance spoken by the each of the contacts who potentially is the second user to generate a confidence score for each of the respective contacts, the confidence score for each respective contact indicating a level of confidence that the respective contact is the second user.

4. The method of claim 3, wherein:
   the respective contacts are ranked according to the confidence score in the list including the plurality of contacts who potentially is the second user.

5. The method of claim 2, further comprising:
   detecting a voice print of the second user based on the at least one utterance spoken by the second user;
   wherein identifying the plurality of contacts who potentially is the second user comprises comparing the detected voice print to voice print data associated with at least one of the plurality of contacts.

6. The method of claim 2, further comprising:
   identifying the at least one spoken utterance as being a name;
   querying a social networking system for information of users of the social networking system who match the name; and
   wherein identifying the plurality of contacts who potentially is the second user comprises receiving from the social networking system the information of the users of the social networking system who match the name.

7. The method of claim 6, wherein identifying the plurality of contacts who potentially is the second user further comprises:
   analyzing contact information of the users of the social networking system who match the name;
   the method further comprising:
   generating a confidence score for each of the respective contacts based at least on the contact information.

8. The method of claim 1, wherein identifying the plurality of contacts who potentially is the second user comprises:
   analyzing previously received messages to identify at least one message that includes at least one written word correlating to the at least one utterance spoken by the second user; and
   identifying a sender or receiver of the at least one message as a contact who potentially is the second user.

9. The method of claim 8, wherein analyzing the previously received messages to identify the at least one message that includes at least one written word correlating to the at least one utterance spoken by the second user comprises:
   analyzing content contained in respective bodies or subject lines of the previously received messages.

10. The method of claim 1, further comprising:
    receiving from the first user a selection of at least one name from the list including the name of each of the plurality of contacts who potentially is the second user; and
    responsive to receiving the selection of the at least one name, prompting the first user to indicate whether the first user desires to have the contact corresponding to the selected name added to a contact list of the first user; and
    responsive to receiving from the first user a user input indicating that the first user desires to have the contact corresponding to the selected name added to the contact list of the first user, adding the contact corresponding to the selected name to the contact list of the first user.

11. The method of claim 1, further comprising:
receiving from the first user a selection of at least one name from the list including at least the name of each of the plurality of contacts who potentially is the second user; and
responsive to receiving the selection of the at least one name, prompting the first user to indicate whether the first user desires to contact with, or follow, the contact corresponding to the selected name in a social network; and
responsive to receiving from the first user a user input indicating that the first user desires to contact with, or follow, the contact corresponding to the selected name in the social network, adding the contact corresponding to the selected name to a contact list of the first user in the social network.

* * * * *